United States Patent Office 3,467,522
Patented Sept. 16, 1969

3,467,522
PHOTOGRAPHIC MATERIAL FOR THE SILVER DYE BLEACH PROCESS
Karl-Heinz Freytag, Leverkusen-Steinbuchel, Carl Taube, Leverkusen, and Bernhard Seidel, Cologne-Mulheim, Germany, assignors to Agfa-Gevaert Aktiengesellschaft, Leverkusen, Germany, a corporation of Germany
No Drawing. Filed Mar. 8, 1966, Ser. No. 532,590
Claims priority, application Germany, Mar. 19, 1965, A 48,674
Int. Cl. G03c 1/10, 5/52
U.S. Cl. 96—99                  9 Claims

ABSTRACT OF THE DISCLOSURE

The invention relates to photographic materials for the silver dye bleach process, which materials contain certain di-(naphthyl-azo)benzene cyan dyes fast to light and with particularly suitable spectral properties.

---

Dyes for the known silver dye bleach process have to meet very high requirements. These dyes must be spectrally suitable, the absence of absorption in unwanted spectral regions next to the position of the absorption maximum being of particular significance. In addition, they must be able to be bleached rapidly and completely. The bleaching of cyan dyes should not pass through red monoazo intermediate stages which may cause the formation of a disturbing red fog. The dyes must be resistant to diffusion in the binder used, which, in practically all cases is gelatin, and it must as far as possible be inert to the photographic emulsion. In addition, it should be fast to light.

A large number of cyan dyes have already been described but they are of limited utility, since they do not meet the requirements referred to hereinbefore.

It is among the objects of the present invention to provide cyan azo dyes which are suitable for the silver dye bleach process. A further object is to provide light-sensitive silver halide emulsion layers, which contain such cyan azo dyes.

We now have found that dyes of the following formula are excellently suitable for the silver dye bleach process:

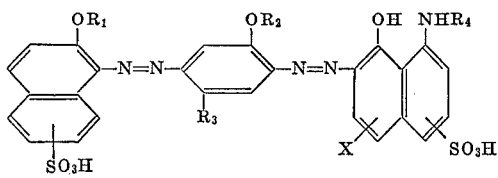

wherein:

$R_1$=alkyl, hydroxyalkyl or alkoxyalkyl;
$R_2$=alkyl, alkoxyalkyl, hydroxyalkyl or hydroxyalkyl that is esterified with an aliphatic carboxylic acid containing preferably up to 5 carbon atoms, more particular with a dicarboxylic acid containing up to 5 carbon atoms;
$R_3$=hydrogen, alkyl, alkoxy, hydroxy substituted alkoxy, hydroxy substituted alkoxy when the hydroxy is esterified with an aliphatic carboxylic acid containing preferably up to 5 carbon atoms, more particular with a dicarboxylic acid containing up to 5 carbon atoms, alkoxyalkyl or alkoxyalkoxy;
$R_4$=acyl, preferably acyl which is derived from aliphatic or aromatic carboxylic acids, in particular benzoyl and substituted benzoyl, suitable substituents being, for example, halogen such as chlorine or bromine, alkyl radicals or halogenated alkyl radicals such as $CF_3$, amino groups, alkyl or phenyl-substituted amino, acyl substituted amino, the acyl group of which being preferably derived from an aliphatic carboxylic acid having up to 5 carbon atoms, more particular from a dicarboxylic acid containing preferably up to 5 carbon atoms, or alkoxy groups;
X=hydrogen or $SO_3H$; the $SO_3H$-groups are preferably in the 3- and 6-position.

The alkyl-, hydroxyalkyl-, alkoxyalkyl- or alkoxyalkoxy groups mentioned above preferably contain up to 3 carbon atoms per alkyl group.

Dyes of the above formula in which $R_3$ is an alkoxy- or alkoxyalkoxy group are particularly useful.

Suitable dyes include those of the following formulae:

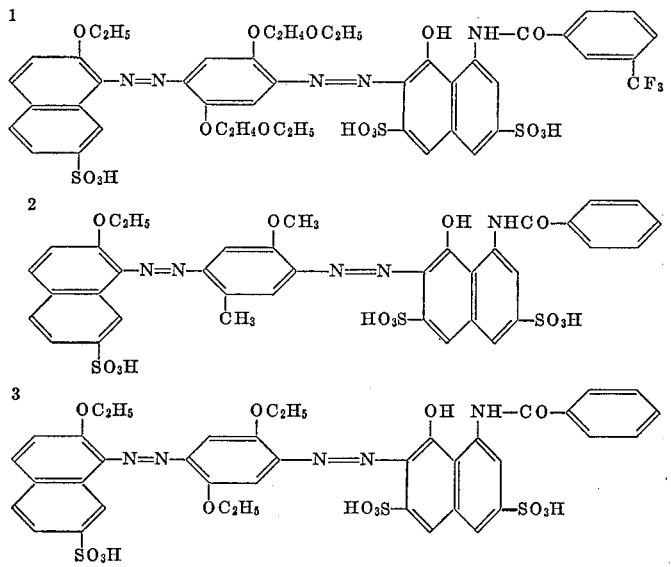

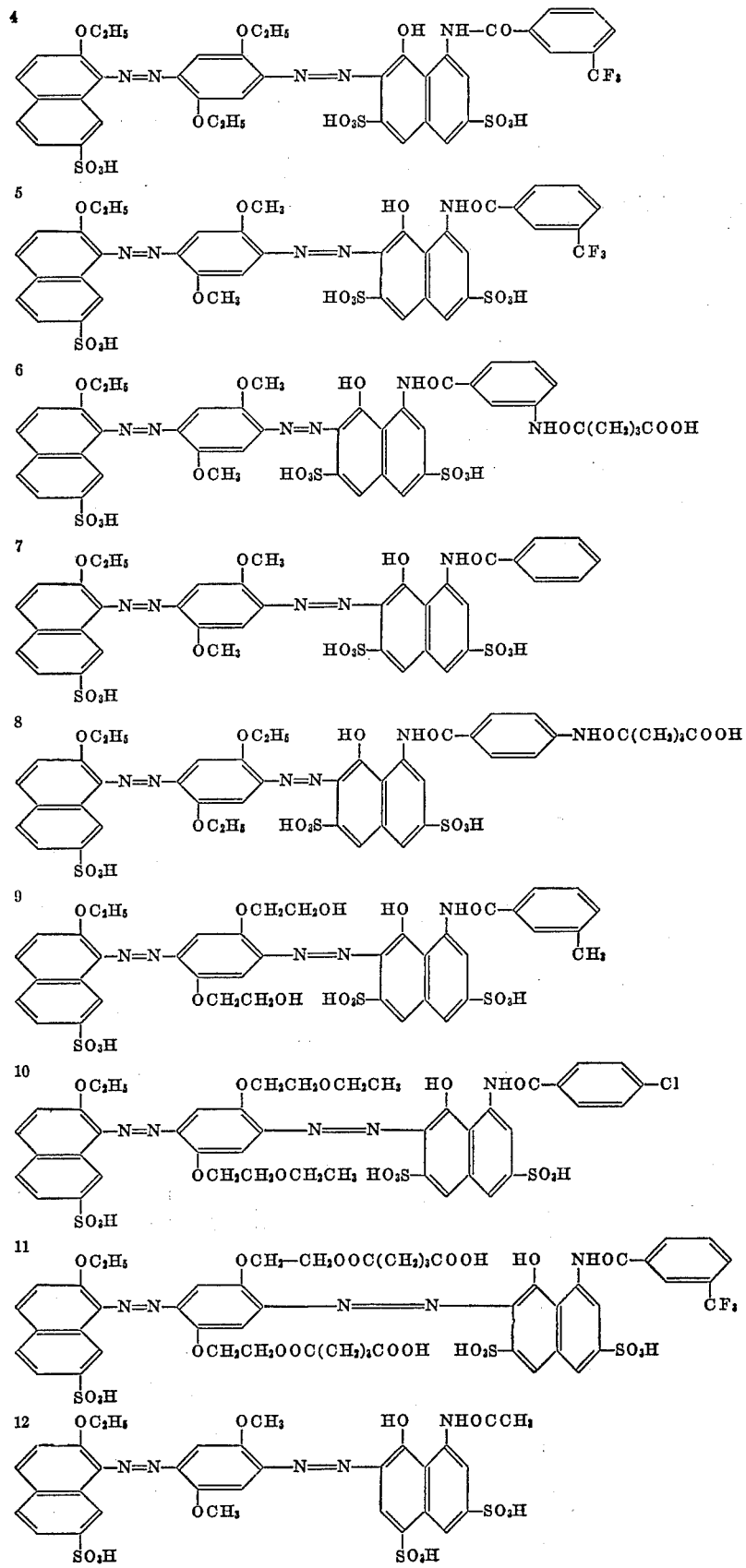

13 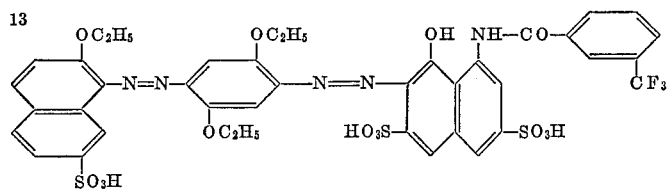

14 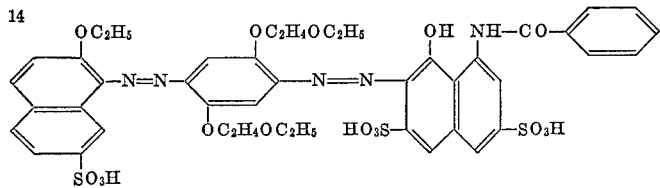

The preparation of the dyes according to the invention may, for example, be carried out as follows:

1-amino-2-ethoxynaphthalene-7-sulfonic acid (A) is diazotized indirectly and coupled to a 1-amino-2,5-dialkoxy-or 1-amino-2,5-dialkoxy-alkoxybenzene (B). The amino azo dye obtained is again diazotized indirectly and again coupled, this time to a 1-acylamino-8-hydroxynaphthalene-3,6-disulfonic acid (C), e.g., 1-(3'-trifluoromethyl - benzoyl) - amino - 8 - hydroxynaphthalene - 3,6-disulfonic acid.

The following compounds are suitable for use as diazo components A:

1-amino-2-methoxynaphthalene-7-sulfonic acid,
1-amino-2-β-ethoxy-ethoxynaphthalene-7-sulfonic acid,
1-amino-2-hydroxyethoxynaphthalene-7-sulfonic acid,
1-amino-2-methoxynaphthalene-6-sulfonic acid.

The following are examples of compounds which may be used as coupling components B:

1-amino-2-methoxy-5-methylbenzene,
1-amino-2-methoxybenzene,
1-amino-2,5-dimethoxybenzene,
1-amino-2,5-dihydroxyethoxybenzene,
1-amino-2,5-diethoxybenzene,
1-amino-2,5-(diglutaroylhydroxy-ethoxy)-benzene,
1-amino-2-hydroxyethoxy-benzene,
1-amino-2-ethoxyethoxybenzene,
1-amino-2-hydroxy-ethoxy-5-methylbenzene, and
1-amino-2-ethoxyethoxy-5-methylbenzene.

The following compounds may, inter alia, be used as coupling components C:

1-benzoylamino-8-hydroxynaphthalene-3,6-disulfonic acid,
1-(4'-benzoylamino-benzoyl)-amino-8-hydroxynaphthalene-3,6-sulfonic acid,
1-(3'-glutaroylamino-benzoyl)-amino-8-hydxorynaphthalene-3,6-disulfonic acid,
1-(4'-succinoylamino-benzoyl)-amino-8-hydroxynaphthalene-3,6-disulfonic acid,
1-(4'-acetylaminobenzoyl)-amino-8-hydroxynaphthalene-3,6-disulfonic acid,
1-(2',4'-dichlorobenzoyl)-amino-8-hydroxynaphthalene-3,6-disulfonic acid,
1-(4'-chlorobenzoyl)-amino-8-hydroxynaphthalene-3,6-disulfonic acid,
1-(3'-methoxybenzoyl)-amino-8-hydroxynaphthalene-3,6-disulfonic acid,
1-acetylamino-8-hydroxynaphthalene-3,6-disulfonic acid,
1-(3'-trifluoromethylbenzoyl)-amino-8-hydroxynaphthalene-3,6-disulfonic acid,
1-benzoylamino-8-hydroxynaphthalene-4,6-disulfonic acid,
1-(3'-trifluoromethylbenzoyl)-amino-8-hydroxynaphthalene-4,6-disulfonic acid,
1-benzoylamino-8-hydroxynaphthalene-4-sulfonic acid, and
1-(3'-trifluoromethylbenzoyl)-amino-8-hydroxynaphthalene-4-sulfonic acid.

The dye of Formula 6 can, for example, be prepared as follows:

26.7 parts by weight of 1-amino-2-ethoxynaphthalene-7-sulfonic acid are dissolved in 300 parts by volume of a dilute aqueous solution of sodium carbonate and diazotized indirectly according to common practice. A hydrochloric acid solution of 15.3 parts by weight of 1-amino-2,5-dimethoxybenzene in 300 parts by volume of water is then added. Coupling is effected at pH 3.5 by the addition of sodium acetate solution (20%). After coupling is completed, the reaction solution is adjusted to pH 1 with concentrated hydrochloric acid, and the amino monoazo dye precipitated is isolated at 70° C. The dye obtained is dissolved at pH 8.5 and diazotized indirectly in known manner. The diazotized monoazo dye partly precipitates. After completion of the diazotization the dye is added to a solution of 45.2 parts by weight of 1 - (3' - glutaroylaminobenzoyl) - amino - 8 - hydroxynaphthalene-3,6-disulfonic acid, 20 parts by weight of sodium carbonate, 80 parts by volume of pyridine and 300 parts by volume of water. The resulting green tinted dye is salted out.

With the high diffusion resistance of the dyes according to the invention, the adjustment between solubility of the dye in water and its diffusion resistance in the layer can be varied as best suited to the particular working conditions mainly by varying the different substituents R in the manner indicated. Therefore, by a suitable combination of substituents, the new dyes do not require any mordanting with organic bases such as aromatic dibiguanides or the like.

The particular working conditions depend mainly on the desired acid strength of the dye bleaching bath and the associated degree of hardening of the layers. This possibility constitutes a further advantage over known dyes of a similar type.

Another advantage lies in the high degree of purity in which the compounds according to the invention are obtained by the method of preparation indicated, so that time-consuming purification by reprecipitation is not necessary. Owing to their good spectral properties, their high fastness to light and the ease with which they can be bleached, combined with their low tendency to the formation of the red monoazo form in the case of only partial bleaching with low color densities, the dyes according to the invention are eminently suitable for all modification of the silver dye bleach process, e.g., a combination of the silver salt diffusion process and the silver dye bleach process suitable for the production of colored images with a characteristic curve opposite to that of the original, as well as for processes which comprise a black-white reversal development. As dye bleaching baths either thiourea baths can be used such as mentioned in British Patents Nos. 397,159 and 507,211 and described, e.g., in German Auslegeschrift 1,041,355 or baths containing quinoline and iodide as indicated in U.S. Patents Nos. 2,629,658 and 2,652,328. Another advantage of the dyes of the present invention lies in the longer wavelength absorption and the more advantageous form of the slopes of the absorption curves compared with cyan dyes known in the art. In this connection, it should be specially pointed out that in the field of azo dyes, the preparation of dyes suitable for the silver dye bleach process with an absorption maximum above 600 nm. in gelatin is particularly difficult if at the same time the undesired absorption in the blue spectral region (400 to 500 nm.) must be kept low. The short-wave absorption slope (towards the green region of the spectrum (500–600 nm.) is in this case of decisive importance, especially for a clear and pure reproduction of green, because the human eye is particularly sensitive in this region.

The superiority of the dyes according to the invention precisely in this respect compared with the most closely related known dyes is readily apparent from the comparison tests given in the table below. This table shows the absorption maxima and the degree of absorption of the dyes for the specified shorter wavelengths. The smaller the degree of absorption at these shorter wavelengths the more advantageous are the dyes. The figures are based on measurements carried out on 0.2% gelatin solutions of these dyes and the degree of absorption at the lower wavelengths is given as a relative value based on an optical density of the absorption maximum of 1.00:

| Dyestuff | Absorption maximum | Relative degree of absorption at shorter wavelengths, in nm. | | | | | | |
|---|---|---|---|---|---|---|---|---|
| | | 520 | 540 | 560 | 570 | 580 | 590 | 600 |
| Standard dye | 603 | 0.16 | 0.24 | 0.45 | 0.635 | 0.80 | 0.92 | 0.99 |
| 2 | 605 | | | 0.41 | 0.570 | 0.73 | 0.87 | 0.985 |
| 3 | 612 | 0.13 | 0.175 | 0.30 | 0.42 | 0.55 | 0.72 | 0.90 |

As a standard dye and dye of the following formula was used:

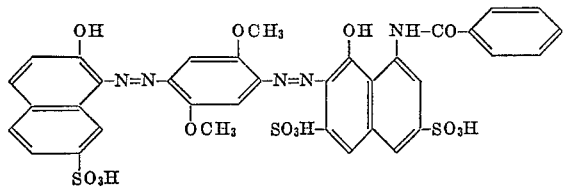

The dyes according to the invention can be used equally successfully for single layered and multi-layered materials for the silver dye bleach process as explained in the following examples.

The azo dyes of the present invention are added to a light-sensitive silver halide emulsion layer. The concentration of the dyes can be varied depending upon the concentration of the silver halide and the effects desired. In general we have found that 30 g. per mol of silver halide are sufficient for the purpose of our invention.

As binding agent for the silver halide emulsion layer the hydrophilic colloids can be used which are customarily employed for dispersing silver halides, for example, gelatin, alone or in combination with other proteins such as albumin, alginic acids and derivatives thereof such as alkali salts, polyvinyl alcohol, polyvinyl pyrrolidones, carboxylalkyl cellulose such as carboxymethyl cellulose etc.

The photographic emulsions may be coated on any of the customary supports for photographic material including paper, cellulose esters, such as cellulose acetate or nitrate, polystyrene, polyesters, in particular polyethylene terephthalate, polycarbonates, preferably bis-hydroxy phenyl alkanes, and the like.

The emulsions may be chemically sensitized by any of the accepted procedures. The emulsion can be treated with salts of noble metals such as ruthenium, rhodium, palladium, iridium or platinum. Suitable compounds are well known in the art. The emulsions can also be sensitized with gold salts as described by R. Koslowsky, Z.wiss.phot. 46 (1951), 62–72.

The emulsions employed can also be chemically sensitized with reducing agents, such as stannous salts, polyamines, sulfur compounds, such as described in U.S. Patent No. 1,574,944, polyethylene oxides and the like.

The emulsions may also contain stabilizers such as organic mercury compounds, heterocyclic compounds, in particular mercapto substituted heterocyclic rings, such as triazoles, tetrazoles or azaindenes, which are disclosed, e.g., by Birr in Z.wiss.phot., vol. 47 (1952), pages 2–28.

The emulsions can also be optically sensitized with sensitizing dyes customarily employed in the art of emulsion making, such as cyanines, merocyanines as described, e.g., by F. M. Hamer "The Cyanine Dyes and related Compounds" published by Interscience Publishers (1964).

It is preferred to use sensitizinug dyestuffs from the merocyanine class, such as described, e.g., in Belgian Patent No. 659,657 and sulfo betaine cyanines.

The emulsion may also be hardened by any suitable hardener such as formaldehyde, halogen substituted aliphatic acids such as mucobromid acid and the like. In view of the treatment with the strongly acidic dye-bleaching bath, very active hardeners are preferred.

The emulsions may contain a suitable gelatin plasticizer such as ethylene glycol, other dihydroxy alkanes, pentaerythritol phosphoric acid esters as described in German Patent No. 1,185,811 and the like.

Example 1

300 ml. of a 3% gelatin solution containing 2.0 g. of dye No. 13 and 0.4 g. of saponin are added to 500 ml. of a silver bromide gelatin emulsion containing about 5 mol percent of silver iodide. The emulsion is sensitized to red light with 12 mg. of the sensitizer according to Example 11 of German Patent No. 1,213,240 and poured over a support of baryta-coated paper or cellulose triacetate. The silver application is about 0.8 g. Ag/m.² After drying, the film is exposed to yellow light under a stepped grey wedge and processed as follows:

(1) Development 5 minutes in a solution of:
   1 g. of p-methylaminophenol
   13 g. of $Na_2SO_3$ sicc.
   3 g. of hydroquinone
   26 g. of soda sicc. and
   1 g. of potassium bromide in 1000 ml. of water
(2) Washing for 1 minute.
(3) Fixing 5 minutes in a solution of:
   200 g. of sodium thiosulfate cryst.
   20 g. of potassium metabisulfite in 1000 ml. of water
(4) Washing for 5 minutes.
(5) Hardening for 5 minutes in a solution of 60 ml. of formalin (30%).
   5 g. of sodium bicarbonate in 1000 ml. of water
(6) Washing for 5 minutes.
(7) Dye bleaching for 15 minutes in a solution of:
   10 g. of potassium iodide
   10 g. of sodium hypophosphite
   25 ml. of sulfuric acid
   50 ml. of quinoline
   10 mg. of 2,3-dimethylquinoxaline in 1000 ml. of water
(8) Washing for 5 minutes.
(9) Bleaching 5 minutes in a bath of:
   25 g. of copper chloride 5 ml. of hydrochloric acid conc. in 1000 ml. of water
(10) Fixing 10 minutes as under 2.
(11) Washing for 20 minutes.

After drying, a cyan dye wedge is obtained which has perfect whites which do not stain or get dissolved even after prolonged exposure to light. The low color densities of the wedge are without any reddish tinge and are very fast to light.

Example 2

The procedure is the same as indicated in Example 1 but the dye is replaced by 2.0 g. of dye No. 14 and the emulsion is applied onto a white pigmented cellulose triacetate foil. After exposure, and processing in baths 1 to 6 as in Example 1, the procedure is as follows:

(7) 5 minutes dye bleaching in a solution of:
  28 g. of thiourea
  18 g. of potassium bromide
  3 mg. of 2-amino-3-hydroxyphenazine
  400 ml. of hydrochloric acid conc. in 1000 ml. of water
(8) Washing for 5 minutes.
(9) Bleach fixing 10 minutes in a solution of:
  26 g. of tetrasodium-ethylenediamine-tetraacetate
  24 g. of soda sicc.
  15 g. of iron (III) chloride
  13 g. of sodium sulfite sicc.
  200 g. of sodium thiosulfate sicc. in 800 ml. of water.
(10) Washing for 20 minutes.

The result obtained is quite similar to that in Example 1. Both layers are eminently suitable as cyan dye layer in a color photographic three-layer material.

Example 3

The procedure is as described in Example 1 with the exception that the dye is replaced by approximately the same quantities of one of the dyes Nos. 5 or 7 to 9. After exposure and processing as in Example 1, similar results are obtained.

Example 4

The procedure is as described in Example 2 but after exposure it is processed as follows:

(1) Development for 5 minutes in a bath as indicated in Example 1.
(2) Washing for 1 minute.
(3) Bleaching for 1 minute in a solution of:
  10 g. of potassium bichromate
  5 g. of sulfuric acid conc. in 800 ml. of water.
(4) Washing for 1 minute.
(5) Treatment for 1 minute in a bath of 5 g. of sodium sulfite sicc. in 1000 ml. of water.
(6) Washing for 1 minute.
(7) 2.5 minutes second exposure with a 40 w. incandescent lamp at 20 cm. distance.
(8) Second development as under 1.
(9) Hardening and further processing as in Example 1 with baths 5–11.

A cyan dye wedge is obtained which has a characteristic curve opposite that of the original.

Example 5

A color photographic multi-layer material for the silver-dye-bleach process is prepared as follows:

The layers indicated below are arranged successively on a support of baryta-coated paper:

(1) A red sensitized layer as indicated in Example 1,
(2) an intermediate layer applied from a 2% gelatin solution,
(3) a green sensitized layer which contains per 500 g. of a silver bromide gelatin emulsion, having a silver iodide content of 3 mol%, 15 mg. of a sensitizer described in Example 2 of German Patent No. 1,213,240 and 2.5 g. of the dye of the following formula:

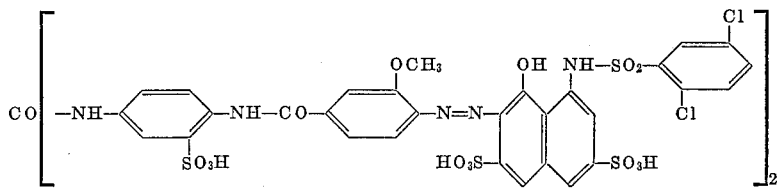

dissolved in 250 ml. of a 2% gelatin solution which also contains the usual quantities of hardening agents (e.g. 4 ml. of a 30% aqueous formaldehyde solution) and 0.4 g. of saponin. The silver concentration is 0.8 g./m.$^2$,
(4) an intermediate layer applied from a 2% aqueous gelatin solution,
(5) a yellow filter layer (optical density 0.5 for a layer thickness of 1 mm.) obtained from a 2% gelatin solution,
(6) an intermediate layer applied from a 2% gelatin solution,
(7) a non-sensitized silver halide gelatin emulsion layer containing 25 g. of silver bromide per kg. and per 500 g. 5 g. of a yellow dye of the following formula:

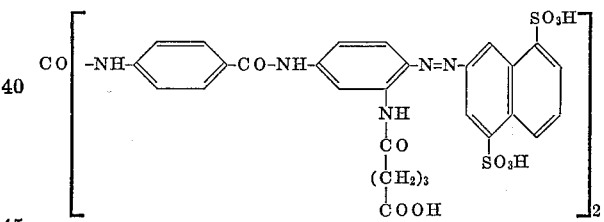

in addition to the usual quantities of hardening agents (4 ml. of a 30% aqueous formaldehyde solution) and 0.5 g. of saponin. The silver concentration is about 0.7 g./m.$^2$,
(8) a protective layer applied from a 2.5% aqueous gelatin solution.

Processing

After drying, the film is exposed behind a multi-colored transparency and processed as described in Example 1, with the exception that 50 mg. of 2,3-dimethylquinoxaline are added to the bleaching bath and the treatment time is increased to 20 minutes.

After washing with water and drying, a reproduction in true colors of the original is obtained. The resulting color photographic image has an unusual brilliancy.

We claim:
1. Light-sensitive photographic material with at least one light-sensitive silver halide emulsion layer dyed with an azo dye of the following formula:

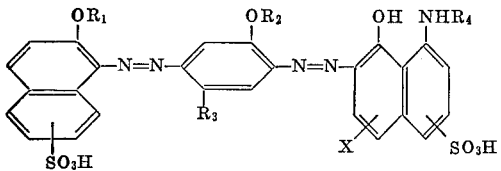

wherein:

$R_1$ represents alkyl, hydroxyalkyl or alkoxyalkyl;
$R_2$ represents alkyl, hydroxyalkyl, hydroxyalkyl esterified with aliphatic carboxylic acid or alkoxy alkyl;
R₃ represents hydrogen, alkyl, alkoxy, hydroxy substituted alkyl, hydroxy substituted alkoxy, the hydroxy group of which is esterified with an aliphatic carboxylic acid, alkoxyalkyl or alkoxyalkoxy;
R₄ represents the acyl group of a carboxylic acid; and
X represents hydrogen or sulfo.

2. Light-sensitive material as defined in claim 1, wherein R₄ represents a benzoyl group.

3. Light-sensitive material as defined in claim 1, wherein the azo dye has the following formula:

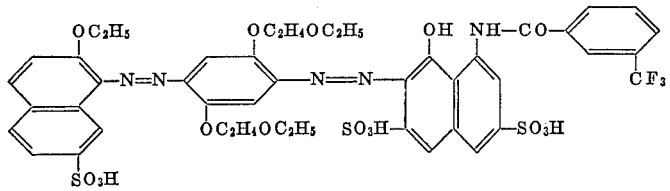

4. Light-sensitive material as defined in claim 1, wherein the azo dye has the following formula:

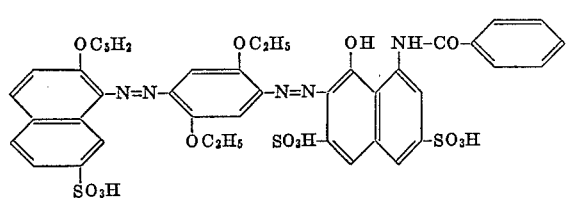

5. Light-sensitive material as defined in claim 1, wherein the azo dye has the following formula:

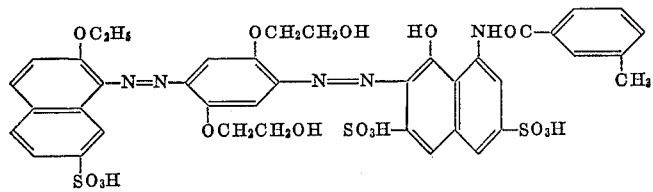

6. Light-sensitive material as defined in claim 1, wherein the azo dye has the following formula:

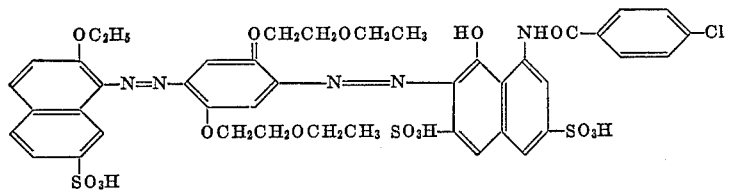

7. Light-sensitive material as defined in claim 1, wherein the azo dye has the following formula:

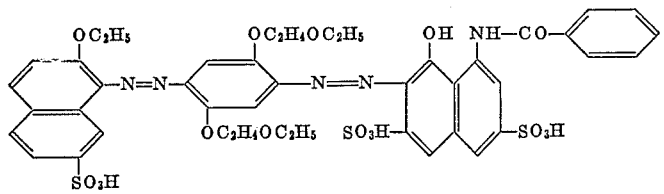

8. Light-sensitive material as defined in claim 1, wherein the azo dye has the following formula:

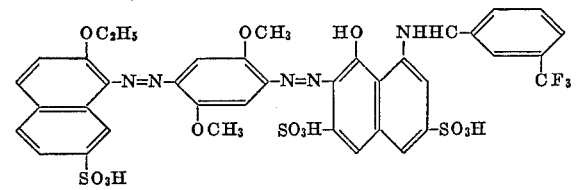

9. A light-sensitive material with at least one light-sensitive silver halide emulsion layer dyed with an azo dye of the following formula:

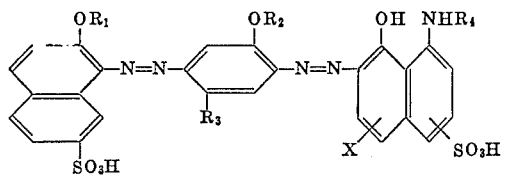

wherein
R₁ represents alkyl, hydroxy substituted alkyl or alkoxy substituted alkyl, the alkyl groups of which have up to 3 carbon atoms;
R₂ represents alkyl, having up to 3 carbon atoms, hydroxy substituted alkyl having up to 3 carbon atoms, hydroxy substituted alkyl having up to 3 carbon atoms and the hydroxy group of which is esterified with an aliphatic carboxylic acid having up to 5 carbon atoms or alkoxy substituted alkyl, the alkoxy group of which has up to 3 carbon atoms;
R₃ represents hydrogen, alkyl having up to 3 carbon atoms, alkoxy having up to 3 carbon atoms, hydroxy substituted alkoxy having up to 3 carbon atoms, hydroxy substituted alkoxy having up to 3 carbon atoms and the hydroxyl group of which is esterified with an aliphatic carboxylic acid having up to 5 carbon atoms or alkoxy substituted alkoxy, the alkyl groups of which have up to 3 carbon atoms;
R₄ represents an acyl radical derived from an aliphatic carboxylic acid having up to 3 carbon atoms or a benzoyl radical; and
X represents hydrogen or sulfo.

References Cited
UNITED STATES PATENTS

| | | | |
|---|---|---|---|
| 2,286,838 | 6/1942 | Seymour et al. | 96—99 |
| 2,629,658 | 2/1953 | Sprung | 96—99 |
| 3,157,508 | 11/1964 | Dreyfuss | 96—99 |

J. TRAVIS BROWN, Primary Examiner

U.S. Cl. X.R.

96—20, 53, 73